March 18, 1952 — C. HABICHT — 2,589,936
DISPENSING DEVICE FOR TABLETS AND THE LIKE
Filed April 14, 1949
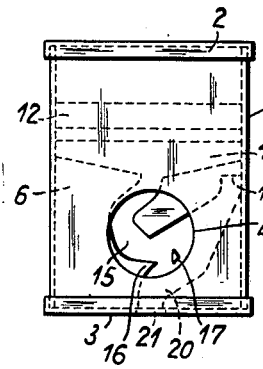
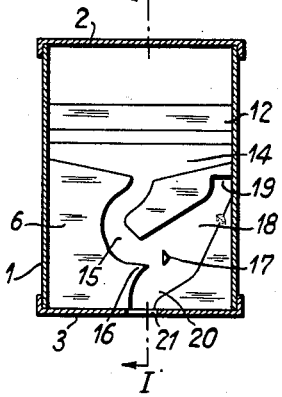
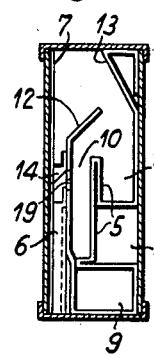
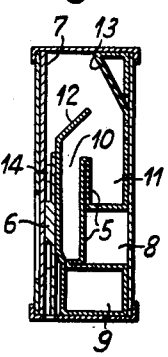
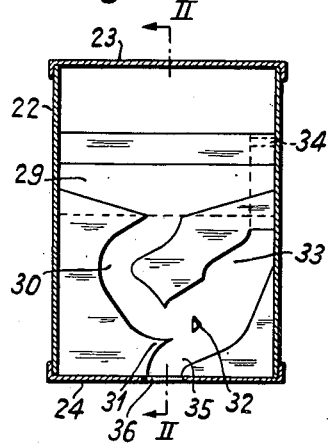
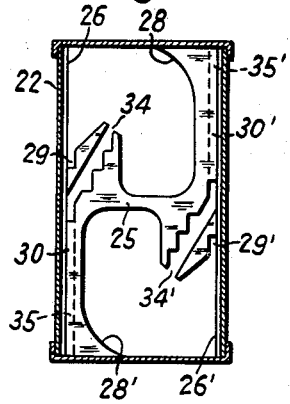
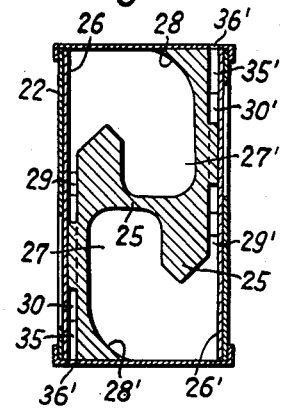
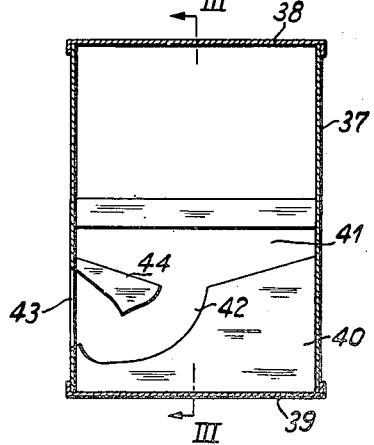
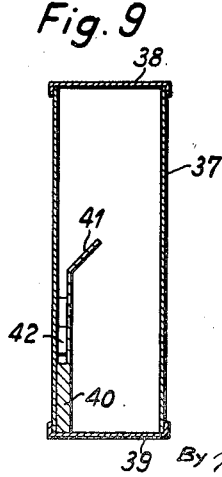
INVENTOR
Conrad Habicht Patented Mar. 18, 1952

2,589,936

UNITED STATES PATENT OFFICE 2,589,936

DISPENSING DEVICE FOR TABLETS AND THE LIKE

Conrad Habicht, Schaffhausen, Switzerland

Application April 14, 1949, Serial No. 87,434
In Switzerland April 9, 1948

3 Claims. (Cl. 206—42)

This invention relates to a dispensing container for tablets and the like.

It is the object of the invention to provide a dispensing container which combines the advantage of a simple and cheap construction with that of a reliable function.

A special object of the invention is to provide a dispensing container which is suitable for the dispensing of objects which are frequently required, such as, e. g. saccharin tablets, pharmaceutical tablets, catechus etc., the design and size of the container being adapted to the size of the articles to be dispensed by mere shaking of the container without operation of relatively movable closure means normally blocking the outlet of the container.

Further objects and features of the invention will be seen from the following detailed description in connection with the accompanying drawing, showing by way of example and purely schematically some embodiments of the invention and in which:

Fig. 1 is a front view of a first embodiment of the dispensing device,

Fig. 2 is a similar view, but showing the device with the front wall cut off,

Fig. 3 is a side view of the device, with the side wall cut off,

Fig. 4 is a cross section on line I—I in Fig. 2,

Fig. 5 is a front view, with the front wall cut off, showing a second modification of the device, Fig. 6 is a side view of the device of Fig. 5, with the side wall cut off, Fig. 7 is a section on line II—II in Fig. 5, Fig. 8 is a front view, with the front wall cut off, showing a third modification, and Fig. 9 is a vertical section on line III—III of Fig. 8.

Similar reference numerals denote similar parts in the different views.

The first two embodiments, shown in Figs. 1 to 4 and Figs. 5 to 7 relate to a saccharin tablet dispensing device, while the modification as per Figs. 8 and 9 shows a dispensing device for aspirin or similar tablets.

Referring now to the drawings in greater detail, and first to Figs. 1 to 4, it will be seen that the casing 1 of sheet metal is of rectangular shape, being closed at its top and bottom ends by covers 2 and 3. The front wall is provided with a window or cut-out 4. Detachably inserted in casing 1 is a reservoir body 5 bent from sheet metal, a guide channel plate 6 and a pane of glass 7. The reservoir body 5 is bent from a single piece of sheet metal, by which two flat reservoirs 10 and 11 are formed over two self-enclosed empty spaces 8 and 9. Owing to the flat configuration of these reservoirs the tablets have only a limited room to move, whereby they are prevented from being bruised by carrying the dispensing device in the pocket. 12 is an inclined guide tongue by which the tablets are moved from compartment 10 to compartment 11 when shaking the device in a vertical direction. A guide surface 13 arranged obliquely above the reservoir 11 carries the tablets into the hopper 14 when shaking the dispensing device. 15 is a tablet guiding channel of a slightly curved shape which leads downward to a projection 16 by which the channel is given a lateral direction. Arranged in front of this projection is a stop member 17 by which the column of tablets in channel 15 is stopped. 18 is a channel which is connected to channel 15 and passes obliquely through the right hand half of casing 1, communicating with the reservoir by an opening 19. An outlet channel 20 branches off from channel 18 in a downward direction. In the bottom wall 3 there is a discharge opening 21 which registers with the mouth end of channel 20.

The device operates in such a manner that when shaking the device, a number of tablets are conveyed into the channel 15 and with each shaking movement one tablet is carried over stop member 17 into the discharge channel 20 through which it leaves the dispensing device.

When carrying the dispensing device in the pocket, the stop member 17 in case of an upright position of the device prevents the tablets from rolling to the outlet from channel 15. In case of a lateral or reversed position of the dispensing device the tablets will roll through channel 15 or channel 18 back into the reservoir. The position of the tablets in the channels 15, 18, 20 in the reach of stop member 17 can be observed by the control window 4.

In the second modification Figs. 5 to 7, the dispensing device is designed as a double-acting device. The sheet metal casing 22 of rectangular shape is closed at its top and bottom ends by an easily detachable cover 23 or 24, respectively. Slidably inserted in casing 22 is a reservoir body 25 with two glass panes 26, 26' engaging its broader sides. At its opposite end faces the reservoir body 2 is provided with open reservoirs 27, 27' into which the tablets can be introduced when the cover 23 or 24 is removed. Each reservoir is formed with a guide wall 28 or 28', which is upwardly curved over its middle part. A discharge hopper or funnel 29 or 29' is provided at each broad side of the body 25 for reception of the tablets which are accelerated towards, and deflected by, the curve 28 when shaking the dispensing device. The funnel terminates in the tablet guiding channel 30 or 30', which is downwardly directed with a slight crank and with a lateral portion formed, in case of the tablet guiding channel 30, by the projection 31. Arranged in front of the projection 31, is a stop member 32 by which the tablet column is stopped.

33 is a return channel connected to channel 30 and rising obliquely to the side, terminating in the reservoir through an opening 34 or 34'. An outlet channel 35 or 35' branches off downwardly from channel 33. In the bottom cover 24 there is an outlet 36 or 36' registering with the mouth end of channel 35 or 35'. Here again as in the first embodiment an inspection window is provided in the casing which permits an accurate examination of the actual position of the tablets. In case of a disturbance of the function, e. g. by obstruction of a table guiding channel by tablet fragments etc. it is not necessary to remove this defect, but one may simply use the second dispensing side of the device.

The third modification is intended for larger tablets, e. g. aspirin tablets etc. This dispensing device also comprises a sheet metal casing 37 of rectangular shape closed at its top and bottom ends by easily detachable covers 38, 39. In this embodiment the whole space of the container serves as a reservoir for the tablets. Provided at the inside of one of the larger side walls of the casing is a channel plate 40 which is enlarged in the form of a funnel 41 at its upper end to which in turn is connected a dispensing channel 42 which is bent towards the side and whose mouth registers with a discharge slot 43 provided in one of the narrow side walls of the casing. The mouth portion of channel 42 rises slightly towards the discharge slot, and the tablet column entered into the discharge channel 42 is stopped by a projection 44. By shaking the dispensing device the respective lowest tablet falls out of the discharge slot laterally at the casing.

Instead of making the casing of the dispensing device of sheet metal, it may also be made of a phenol-formaldehyde condensation product.

My novel dispensing device as hereinbefore described may be used for dispensing articles of various types, more particularly articles of a disk or spherical shape. It is also possible, e. g. to dispense balls for ball bearings etc.

As various possible embodiments might be made of the above invention, and as various changes might be made in the embodiments above set forth, it is to be understood that all matter herein set forth as shown in the accompanying drawing is to be interpreted as illustrative and not in a limiting sense.

Having thus described my invention, I claim as new and desire to secure by Letters Patent:

1. A container for dispensing articles of a predetermined size, comprising a container body, a detachable cover at least at one end face thereof, and partition wall means defining in said container a main compartment for the articles to be dispensed, said main compartment occupying substantially the lower part of the container, a funnel whose upper edge is sufficiently spaced from the cover to permit the articles to be conveyed from the main compartment into said funnel by a shaking action overcoming the level difference between the main compartment and the funnel and a downwardly directed passageway formed between the partition wall means and one of the outer walls of the container, said passageway connecting said funnel with a discharge opening and comprising a constricted portion only slightly exceeding the size of a single article and a rising portion at the end of the constricted portion, whereby articles conveyed into said passageway through said funnel will be checked at the rising portion and allowed to be discharged only singly, by further shaking action overcoming said rising portion.

2. A container for dispensing articles of a predetermined size, comprising a container body, a detachable cover at least at one end face thereof, and partition wall means defining in said container a main compartment for the articles to be dispensed, said main compartment occupying substantially the lower part of the container, an intermediate compartment arranged at a higher level than the main compartment and separated therefrom by an intermediate wall, a funnel at a higher level than the intermediate compartment, deflecting means for guiding the articles from the main compartment into the intermediate compartment by a shaking action overcoming the level difference between the two compartments, and from the intermediate compartment into the funnel by a further shaking action overcoming the level difference between the intermediate compartment and the funnel, and a downwardly directed passageway formed between the partition wall means and one of the outer walls of the container, said passageway connecting said funnel with a discharge opening and comprising a constricted portion only slightly exceeding the size of a single article and a rising portion at the end of the constricted portion, whereby articles conveyed into said passageway through said funnel will be checked at the rising portion and allowed to be discharged only singly, by further shaking action overcoming said rising portion.

3. A container for dispensing articles of a predetermined size, comprising a container body, detachable covers at both end faces thereof, and partition wall means defining in said container two complementary halves each comprising a main compartment for the articles to be dispensed, said main compartment occupying substantially the part of the respective container half facing away from its associated cover, a funnel whose inlet edge is sufficiently spaced from the associated cover to permit the articles to be conveyed from the respective main compartment into the associated funnel by a shaking action overcoming the level difference between the main compartment and the funnel with the container in an upright position in relation to the respective cover, and a downwardly directed passageway formed between the partition wall means and one of the outer walls of the container, said passageway connecting said funnel with a discharge opening and comprising a constricted portion only slightly exceeding the size of a single article and a rising portion at the end of the constricted portion, whereby articles conveyed into said passageway through said funnel will be checked at the rising portion and allowed to be discharged only singly, by further shaking action overcoming said rising portion.

CONRAD HABICHT.

REFERENCES CITED

The following references are of record in the file of this patent:

UNITED STATES PATENTS

| Number | Name | Date |
| --- | --- | --- |
| 2,348,449 | Chandler | May 9, 1944 |
| 2,362,609 | Blackman | Nov. 14, 1944 |